HERBICIDAL N,N-ALKYL ALKYLIMINOALKYL THIOCARBAMATES

Harry Tilles, El Cerrito, Calif., assignor to Stauffer Chemical Company, New York, N.Y.
No Drawing. Filed Dec. 14, 1970, Ser. No. 98,022
Int. Cl. C07c 155/08
U.S. Cl. 260—455 A                   12 Claims

ABSTRACT OF THE DISCLOSURE

Novel N,N-alkyl alkyliminoalkyl thiocarbamates are disclosed. The compounds are useful as herbicides.

BACKGROUND OF THE INVENTION

This invention relates to certain novel compositions and to their use as herbicides. More particularly, the invention relates to certain N,N-alkyl substituted thiocarbamates, and the use of these materials as herbicides.

SUMMARY OF THE INVENTION

The compounds of the present invention have the formula

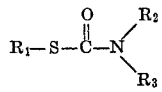

wherein $R_1$ is a member selected from the group consisting of lower alkyl, preferably having 1 through 8 carbon atoms, halo-lower alkyl, preferably having 1 through 8 carbon atoms, alkenyl, preferably having 1 through 8 carbon atoms, haloalkenyl, preferably having 1 through 8 carbon atoms, and benzyl; $R_2$ is lower alkyl, preferably containing 1 through 8 carbon atoms, and $R_3$ is $R_4C=NR_2$ wherein $R_4$ is $R_2$ or H. A preferred grouping of the compositions is that in which $R_1$ is selected from the group consisting of alkyl containing 1 through 6 carbon atoms, benzyl and halo-lower alkyl of 1 through 6 carbon atoms, and $R_2$ is alkyl containing 1 through 6 carbon atoms. The term "halo" used in describing the present invention encompasses the moieties chloro-, bromo-, iodo-, and fluoro-, and includes poly- as well as mono-substituted.

In general, the method of the invention comprises contacting undesired vegetation or a locus to be protected with an effective or herbicidal amount of a composition having the formula above indicated.

DETAILED DESCRIPTION OF THE INVENTION

Broadly, the compounds of the invention may be prepared by reacting a compound of the formula

wherein $R_1$ is as above indicated with a compound of the formula

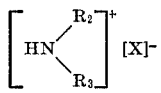

wherein $R_2$ and $R_3$ are as above indicated and X is an anion such as the acetate ion, and in the presence of an organic amine, such as triethylamine.

The reaction may be shown, generally, as follows:

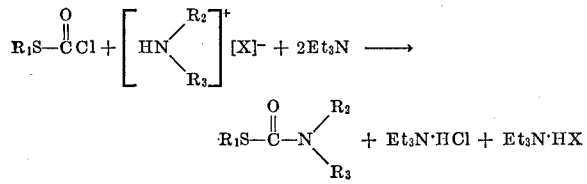

The concentration of the reactants employed are not particularly critical, although generally an excess of the imino component will be employed. A suitable concentration will be from about 1.0 mol to about 2.5 mols of the imino compound per mol of thio acid halide, although additional quantities may be present.

The reactions are preferably carried out in a solvent for the reactants. Suitable solvents include water, ether, benzene, chloroform or tetrahydrofuran. Reactions of this type are normally exothermic so that the addition of heat is not required. In actuality, cooling is sometimes required to control the reaction rate. The reaction will normally be carried out at a temperature of from about −15° C. to about 55° C. Pressures may be atmospheric, subatmospheric or greater than atmospheric, as desired.

The imino intermediates for production of the compounds of the invention may be prepared by following the procedure disclosed by Taylor, et al., Journal of Organic Chemistry, vol. 28, page 1108 (1963). This method is illustrated by the following general reaction:

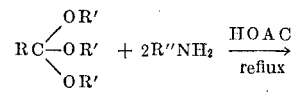

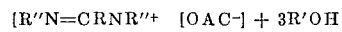

The following examples illustrate methods by which the compounds of the invention can be made:

EXAMPLE 1

Preparation of N,N-dipropylformamidine acetate

About 74.0 grams of thriethyl ortho formate (0.5 mol) and 30.0 grams of glacial acetic acid (0.5 mol) are combined in a flask and heated to reflux. About 59 grams (1.0 mol) of n-propylamine are then added from an addition funnel over a period of about 18 minutes. The reaction system then is kept under reflux for about an hour and a half, and then is cooled and allowed to stand overnight. The volatile material is then removed by distillation, and the residue is concentrated further by high vacuum, and is then distilled through a Kontes falling film still. The product, N,N-dipropylformamidine acetate, has an $N_D^{30}$ of 1.4589.

EXAMPLE 2

Preparation of S-methyl N-propyl-N-propyliminomethyl thiocarbamate

About 13.2 grams (0.07 mol) of the N,N-dipropylformamidine acetate and 200 ml. of diethyl ether are charged to a flask and stirred. About 7.8 g. (.07 mol) of methyl chlorothiolformate is added at about 22.5° C. The system is then cooled to about 10° C., and about 14.1 g. (0.14 mol) of triethylamine is added to the system. The system is then stirred for about thirty minutes, heat is applied to raise the temperature to about 34° C. Twenty minutes later about 100 ml. of diethyl ether is added to facilitate stirring, and after an additional 15 minutes the system is cooled. The mixture is filtered and the triethylamine hydrochloride cake is separated and washed with diethyl ether, the ether washings being combined with the filtrate. The filtrate is then washed with water, dried over MgSO$_4$, filtered and concentrated. The residual liquid is distilled in a Podbielniak column to produce S-methyl N-propyl-N-propyliminomethylthiocarbamate. Structure is confirmed by analysis.

EXAMPLE 3

Preparation of S-ethyl N-propyl-N-propyliminomethylthiocarbamate

The general procedure of Example 1 is repeated except that about 24.0 grams of N,N-dipropylformamidine acetate and 18.7 grams of ethyl chlorothiolformate is employed. Structure is confirmed by analysis.

EXAMPLE 4

Preparation of S-3-chloropropyl N-propyl-N-propyliminomethylthiocarbamate

The general procedure of Example 2 is repeated except that 20.8 grams of chloropropyl chlorothiolformate and about 18.6 grams of N,N-dipropylformamidine are employed.

EXAMPLE 5

Preparation of S-benzyl N-ethyl-N-ethyliminomethylthiocarbamate

A procedure similar to that of Example 2 is followed except that 31.7 grams of benzyl chlorothiolformate and 27.2 grams of N,N-diethylformamidine acetate are employed.

EXAMPLE 6

Preparation of S-methyl-N-propyl-N[α-(propylimino)ethyl]thiocarbamate

A procedure similar to that of Example 2 is followed, except that 20.2 grams of N,N'-dipropyl acetamidine acetate and 11.2 grams of methyl chlorothiolformate are employed. The N,N'-dipropyl acetamidine acetate is formed in a manner similar to that of Example 1, except that 81.3 grams of triethyl ortho-acetate is employed instead of triethylorthoformate.

EXAMPLE 7

Preparation of S-(1-propenyl)-N-propyl-N-propylimino methyl thiocarbamate

The procedure of Example 2 is repeated, except that 13.6 grams of 1-propenyl chlorothiolformate is employed instead of n-propyl chlorothiolformate.

The following is a table of preferred compounds which may be prepared according to the invention:

(1) S-methyl N-propyl-N-propyliminomethyl thiocarbamate
(2) S-ethyl N-propyl-N-propyliminomethyl thiocarbamate
(3) S-propyl N-propyl-N-propyliminomethyl thiocarbamate
(4) S-isopropyl N-propyl-N-propyliminomethyl thiocarbamate
(5) S-butyl N-propyl-N-propyliminomethyl thiocarbamate
(6) S-(2-chloroethyl)-N-propyl-N-propyliminomethyl thiocarbamate
(7) S-(3-chloropropyl)-N-propyl-N-propyliminomethyl thiocarbamate
(8) S-pentyl N-propyl-N-propyliminomethyl thiocarbamate
(9) S-octyl N-propyl-N-propyliminomethyl thiocarbamate
(10) S-octyl N-ethyl-N-ethyliminomethyl thiocarbamate
(11) S-benzyl N-ethyl-N-ethyliminomethyl thiocarbamate
(12) S-hexyl N-propyl-N-propyliminomethyl thiocarbamate
(13) S-(1-propenyl) N-propyl-N-propyliminomethyl thiocarbamate
(14) S-(1-butenyl) N-propyl-N-propyliminomethyl thiocarbamate
(15) S-(4-chloro-1-butenyl) N-propyl-N-propyliminomethyl thiocarbamate
(16) S-benzyl N-propyl-N-propyliminomethyl thiocarbamate
(17) S-methyl N-ethyl-N-ethyliminomethyl thiocarbamate
(18) S-ethyl N-ethyl-N-ethyliminomethyl thiocarbamate
(19) S-propyl N-ethyl-N-ethyliminomethyl thiocarbamate
(20) S-isopropyl N-ethyl-N-ethyliminomethyl thiocarbamate
(21) S-butyl N-ethyl-N-ethyliminomethyl thiocarbamate
(22) S-methyl N-propyl-N-[α-(propylimino)ethyl]thiocarbomate
(23) S-ethyl N-propyl-N-[α-(propylimino)ethyl]thiocarbomate
(24) S-propyl N-propyl-N-[α-(propylimino)ethyl]thiocarbomate
(25) S-isopropyl N-propyl-N-[α-(propylimino)ethyl]thiocarbomate As previously indicated, the compositions of the invention are phytotoxic compounds which are useful and valuable in controlling various plant species. The compounds designated as 2, 5, 7, 9, 11, 12, 16, 18, 19, and 24 in the table were tested as herbicides in the following manner.

Seeds of four species including crabgrass, mustard, curled dock, and one crop pinto beans (*Phaseolus vulgaris*) are planted about one-half inch deep in sandy loam soil in individual rows in flats. Enough seeds are planted to give 30 to 50 plants of each species per flat, and the flats are watered after planting. The flats are placed in the greenhouse at 50° to 85° F. and watered daily with a sprinkler. About 10 to 14 days after planting when the primary leaves of the bean plant are almost fully expanded and the first trifoliate leaves are just starting to form, the plants are sprayed. The spray is prepared by weighing out about 50 mg. of the test compound, dissolving it in 15 ml. of acetone containing about 1 percent Tween®-(polyoxyethylene monolaurate), and then adding 5 ml. of water. The solution is sprayed on the foliage using an atomizer. The spray concentration is about 0.5% and the rate would be approximately 20 lb./acre if all of the spray was retained on the plant and soil. However, since some spray is lost, it is estimated that the actual application rate is approximately 12.5 lb./acre.

The treated plants are placed back in the greenhouse and care is taken to avoid sprinkling the treated foliage with water for three days after treatment. Water is applied to the soil by means of a slow stream from a watering hose. Injury rates are recorded 14 days after treatment. A rating of 0 to 10 is given based on estimated injury or kill. The results of this test are reported in Table II.

TABLE II
[Rate 20 lbs./acre]

| Compound No. | Crabgrass (Digitaris sanguinalis) | Mustard (Brassica juncea) | Curled dock (Rumex crispus) | Pinto bean (Phaseolus vulgaris) |
|---|---|---|---|---|
| 2 | 9 | 9 | 1 | 9 |
| 5 | 9 | 9 | 6 | 9 |
| 7 | 9 | 9 | 9 | 9 |
| 9 | 9 | 9 | 9 | 6 |
| 11 | 9 | 9 | 9 | 9 |
| 12 | 9 | 9 | 9 | 9 |
| 16 | 9 | 6 | 9 | 9 |
| 18 | 9 | 9 | 3 | 9 |
| 19 | 9 | 9 | 1 | 9 |
| 24 | 9 | 9 | 6 | 6 |

As can be seen by the test results, the compounds of the invention are useful as herbicides. The compounds may be applied directly to the particular undesired plant species or may be applied to a locus to be protected. In either event, it is, of course, necessary that the unwanted species receive an effective dosage of amount, i.e., an amount sufficient to kill or retard growth.

The compounds are normally employed with a suitable carrier and may be applied as a dust, spray, drench or aerosol. The compounds thus may be applied in combination with solvents, diluents, various surface active agents (for example, detergents, soaps, or other emulsifying or wetting agents, surface active clays), carrier media, adhesives, spreading agents, humectants, and the like. They may also be combined with other biologically active compositions, including other herbicides, fungicides, bactericides, and algaecides, insecticides, growth stimulators, acaricides, molluscicides, etc., as well as with fertilizers, soil modifiers, etc. The compounds of the invention may be used in combination with an inert carrier and a surface active or emulsifying agent and may also be applied in combination with other biologically active materials, in conjunction with a carrier and a surface active or emulsifying agent. The solid and liquid formulations can be prepared by any of the conventional methods well-known to those skilled in the art. Determination of the optimum effective concentration for a specific application is readily conducted by routine procedures, as will be apparent to those skilled in the art. As indicated, the amount applied in a given case will be an effective amount, i.e., an amount sufficient to give the type of control desired.

Various changes and modifications may be made without departing from the spirit and the scope of the invention described herein, as will be apparent to those skilled in the art to which it pertains.

I claim:
1. Compounds having the formula

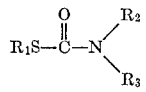

wherein $R_1$ is a member selected from the group consisting of alkyl, having 1 through 8 carbon atoms, chloro- lower alkyl, alkenyl, having 1 through 4 carbon atoms, chloro- alkenyl, having 1 through 4 carbon atoms, and benzyl; $R_2$ is lower alkyl, containing 1 through 4 carbon atoms, and $R_3$ is $R_4C=NR_2$ wherein $R_4$ is methyl or H.

2. The compounds of claim 1 wherein $R_1$ is a member selected from the group consisting of alkyl containing 1 through 6 carbon atoms, chloro- lower alkyl containing 1 through 6 carbon atoms, and benzyl.

3. The compound of claim 1 wherein $R_1$ is ethyl, $R_2$ is n-propyl, and $R_3$ is n-propyliminomethyl.

4. The compound of claim 1 wherein $R_1$ is n-butyl, $R_2$ is n-propyl, and $R_3$ is n-propyliminomethyl.

5. The compound of claim 1 wherein $R_1$ is 3-chloropropyl, $R_2$ is n-propyl, and $R_3$ is n-propyliminomethyl.

6. The compound of claim 1 wherein $R_1$ is n-octyl, $R_2$ is n-propyl, and $R_3$ is ethyliminomethyl.

7. The compound of claim 1 wherein $R_1$ is benzyl, $R_2$ is ethyl, and $R_3$ is ethyliminomethyl.

8. The compound of claim 1 wherein $R_1$ is n-hexyl, $R_2$ is n-propyl, and $R_3$ is n-propyliminomethyl.

9. The compound of claim 1 wherein $R_1$ is benzyl, $R_2$ is n-propyl, and $R_3$ is n-propyliminomethyl.

10. The compound of claim 1 wherein $R_1$ is ethyl, $R_2$ is ethyl, and $R_3$ is ethyliminomethyl.

11. The compound of claim 1 wherein $R_1$ is n-propyl, $R_2$ is ethyl, and $R_3$ is ethyliminomethyl.

12. The compound of claim 1 wherein $R_1$ is n-propyl, $R_2$ is n-propyl, and $R_3$ is $\alpha$-(n-propylimino)ethyl.

References Cited
UNITED STATES PATENTS

| | | | |
|---|---|---|---|
| 2,608,575 | 8/1952 | Mathes | 260—455 A |
| 3,364,140 | 1/1968 | Wehner | 210—64 |
| 3,449,111 | 6/1969 | Wright | 71—100 |
| 3,499,022 | 3/1970 | D'Amico | 71—100 |

OTHER REFERENCES

Loo, "1-β-Chlorophenyl-2,4-diamino-6,6-dimethyl, etc." (1954), CA 49, p. 12493 (1955).

Taylor et al., "A Convenient Synthesis of N,N'-Disubstituted." (1962), J. Org. Chem. 28, pp. 1108–12 (1963).

LEWIS GOTTS, Primary Examiner

G. HOLLRAH, Assistant Examiner

U.S. Cl. X.R.

71—100; 260—501.14